United States Patent [19]

Berardino

[11] Patent Number: 5,201,565
[45] Date of Patent: Apr. 13, 1993

[54] METHOD AND APPARATUS FOR COVERING A VEHICLE INTERIOR

[76] Inventor: Anthony J. Berardino, 135 Golden Ridge Rd., Danville, Calif. 94526

[21] Appl. No.: 805,038

[22] Filed: Dec. 11, 1991

[51] Int. Cl.$^5$ .............................................. B60J 11/00
[52] U.S. Cl. ..................................... 296/136; 160/354
[58] Field of Search ........................ 296/136; 150/166; 160/354, 368.1, 378

[56] References Cited

U.S. PATENT DOCUMENTS

| 1,878,943 | 9/1932 | Locke et al. | 296/98 |
| 2,638,378 | 5/1953 | Molinaro | 296/136 |
| 3,021,894 | 2/1962 | La Due | 160/23.1 |
| 3,075,805 | 1/1963 | Golde et al. | 296/98 |
| 4,355,839 | 10/1982 | Rosen | 296/136 |
| 4,641,600 | 2/1987 | Halvorsen | 114/361 |
| 4,657,298 | 4/1987 | Yong O | 296/136 |
| 4,799,728 | 1/1989 | Akers et al. | 296/136 |
| 4,828,319 | 5/1989 | Benson | 296/136 |
| 4,863,210 | 9/1989 | Kenon | 150/166 X |
| 4,958,881 | 9/1990 | Piros | 296/98 |
| 5,102,183 | 4/1992 | Swartz | 296/136 |

FOREIGN PATENT DOCUMENTS 488356 11/1975 Australia .............................. 296/136

Primary Examiner—Charles A. Marmor
Assistant Examiner—Andrew C. Pike
Attorney, Agent, or Firm—Flehr, Hohbach, Test, Albritton & Herbert

[57] ABSTRACT

A vehicle interior cover (30) for use with a vehicle (10) includes a sheet-like cover member (32), a rear securing assembly (34), and a front securing assembly (36). The front securing assembly (36) preferably includes a resiliently flexible transversely extending rod (48) which is suitably dimensioned for resilient bowing between opposed sides (26, 26') of the vehicle interior in order to releasably secure the sheet-like cover (32) to the interior (12) proximate the vehicle dashboard (16). The transversely extending rod (48) is bowed to tension the sheet-like cover (32) between the rear interior portion (14) and the dashboard portion (16) in a distended condition over the interior (12). The rear securing assembly (34) may be a transversely extending enlarged member (44) which is trapped in a transversely extending slot between structural members (22,24) of the vehicle. Both the front securing assembly (36) and rear securing assembly (34) allow fastener-free installation and deployment of cover member (32). A cover storage envelope (70) is secured proximate the rear securing assembly (34) for convenient and aesthetic storage of the cover (32) inside the vehicle interior.

21 Claims, 3 Drawing Sheets

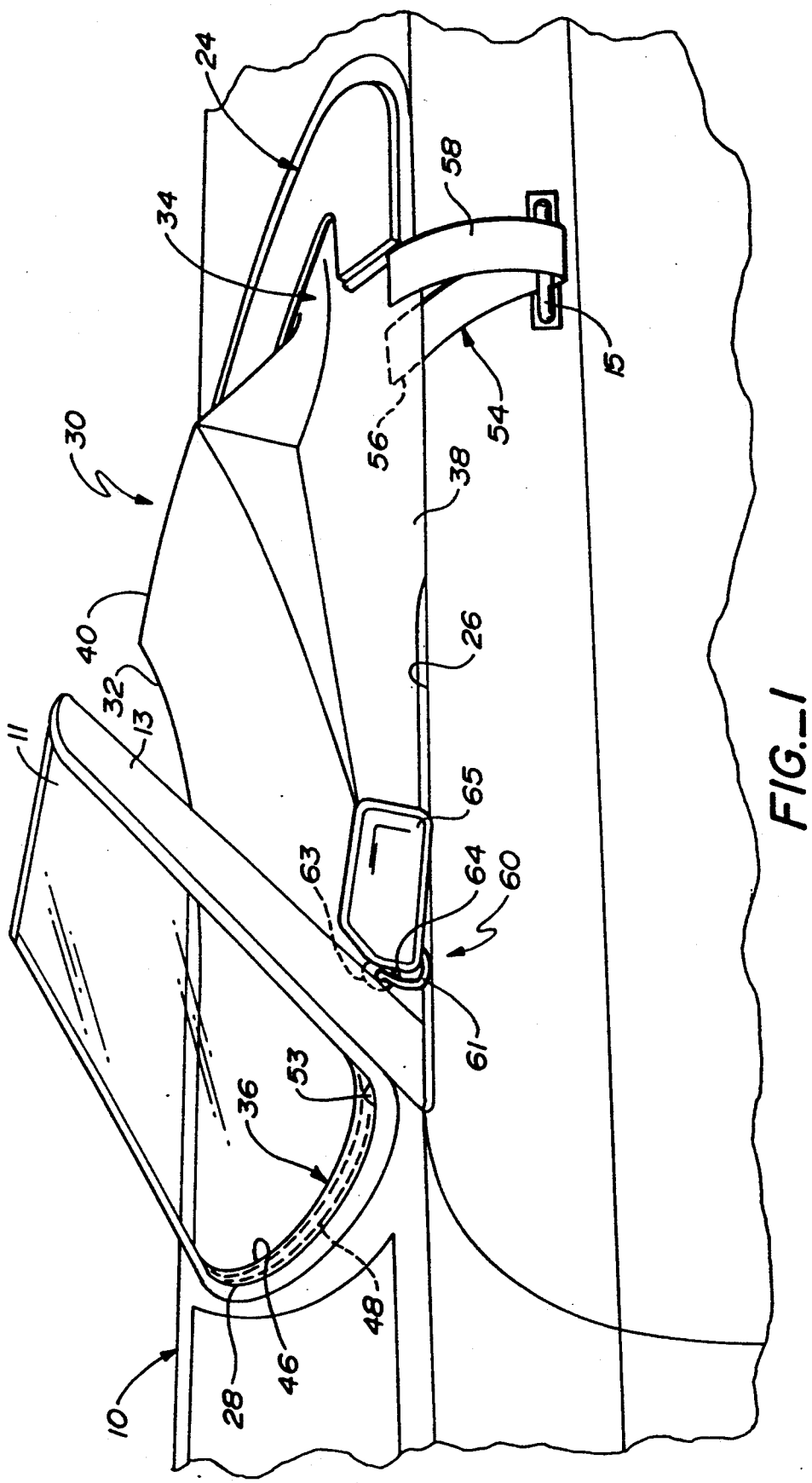

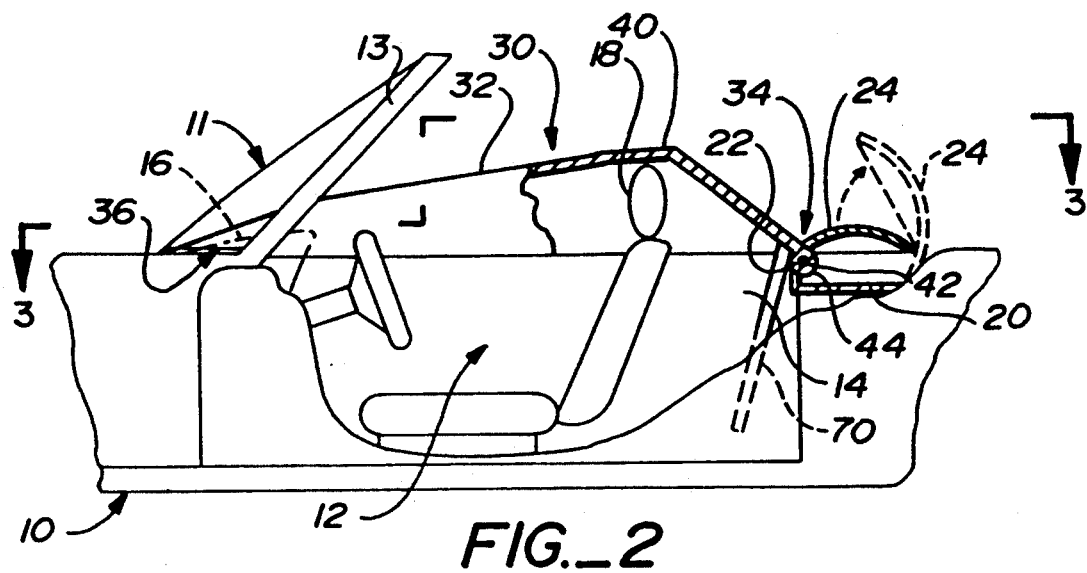
FIG._2
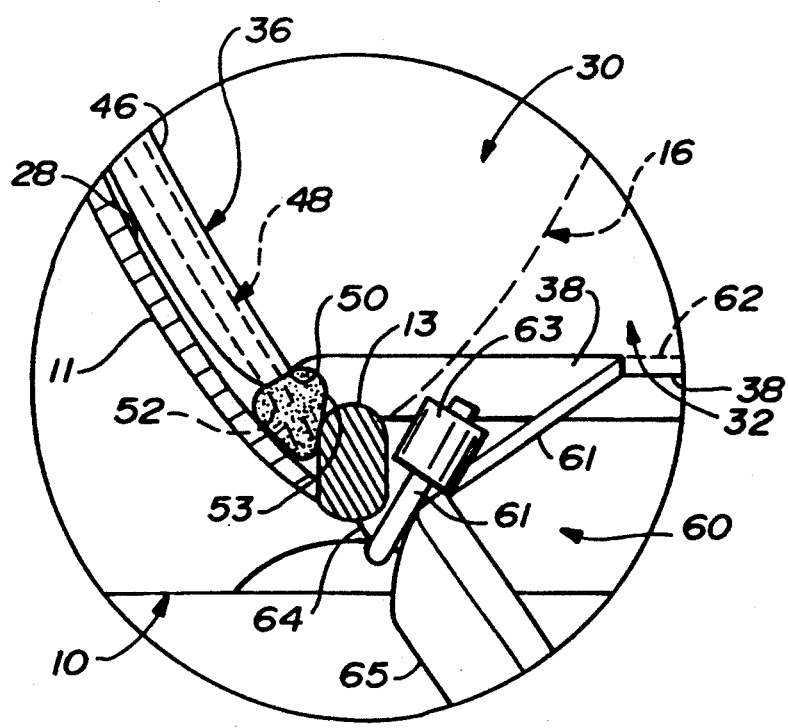
FIG._4

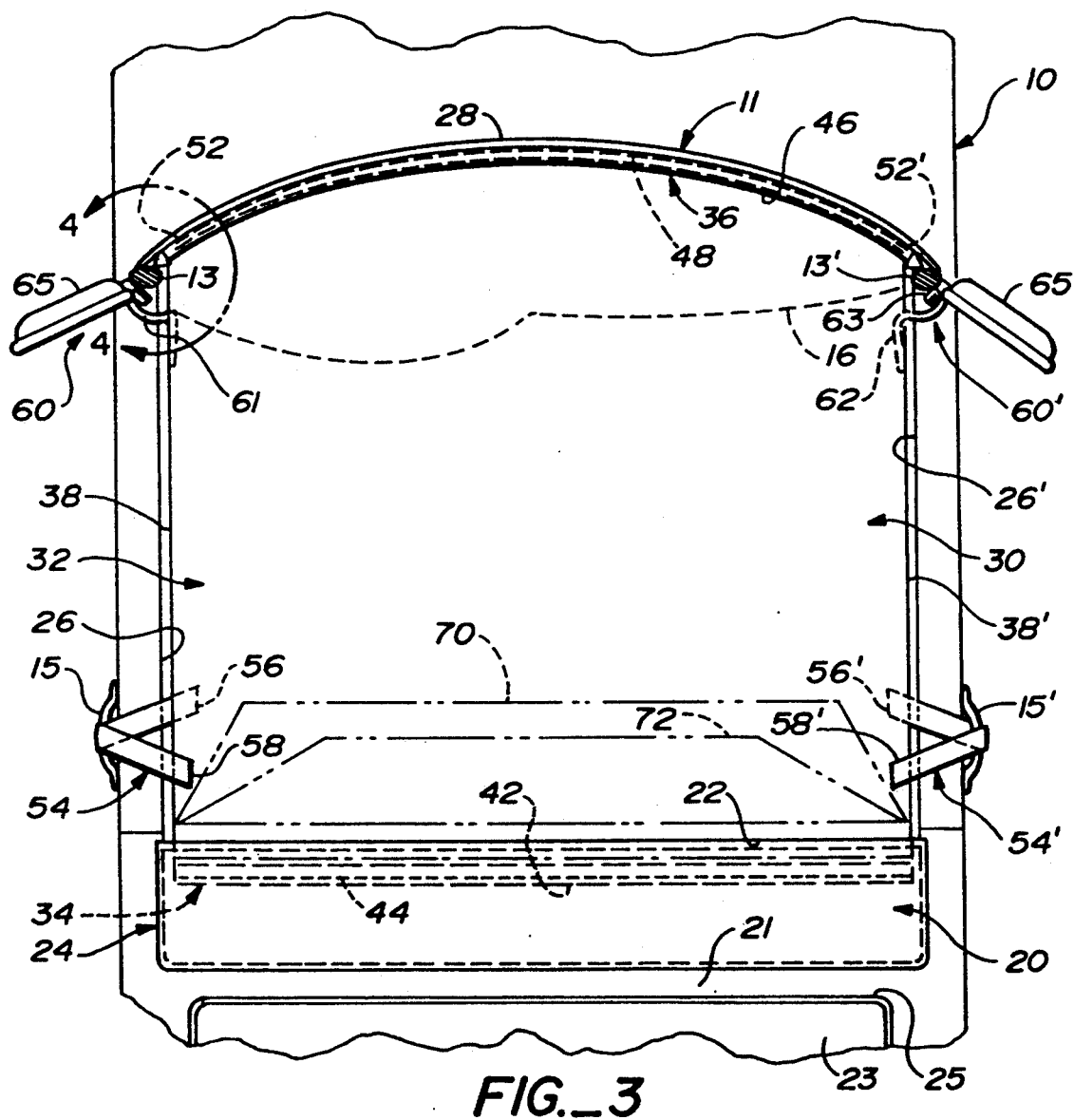
FIG._3

METHOD AND APPARATUS FOR COVERING A VEHICLE INTERIOR

BACKGROUND OF THE INVENTION

1. Field of the Invention

The present invention relates to vehicle covers and, more particularly, to covers of the type employed on convertible automobiles to cover their interiors when the top is down.

2. Description of the Related Art

Vehicle interior covers, similar to vehicle exterior covers, are often deployed over the vehicle interior to reduce dust accumulation and to mask the damaging effects of ultraviolet rays. This is particularly true for convertible automobiles in which the interior is subjected to climatic weathering when the top is down. Typically, such vehicle interior covers extend from proximate the rear window to proximate the front window and, amongst other advantages, protect the seats and dashboard and various structures therebetween. Since these covers often are constructed of fabric or non-rigid materials, they must be secured to the vehicle in order to retain them properly over the vehicle interior in a distended condition. Usually, such covers are secured to the vehicle by fastening snaps or other fasteners disposed about the cover which correspondingly engage mating fasteners positioned strategically about the perimeter of the vehicle interior.

Unfortunately, one inherent problem with such prior art interior covers is that they generally require fasteners which are permanently mounted to the vehicle, such as snaps or buttons. Installing and/or replacing such snaps or buttons is cumbersome and normally cannot be readily accomplished by the car owner himself. Moreover, not only are these car-mounted fasteners aesthetically unattractive, but they involve installation as well as parts costs.

Interior vehicle covers also have been developed which more fully integrate the securing mechanism into the vehicle for aesthetic reasons. One such prior art approach is to affix a track on opposing parallel sides of the vehicle interior and provide mating guide members coupled to the opposing sides of a cover. These systems also may include complex systems for extending or retracting the cover manually, or electromechanically, over the interior.

Typical of such an approach is the cover assembly set forth in U.S. Pat. No. 4,641,600 to Halvorsen, which discloses an extendable and retractable interior cover for a boat. This cover is transversely disposed across the boat interior and retracts to a furled position transversely mounted proximate the rear of the interior. Upon extension over the interior, the cover, including a guiding mechanism coupled to the opposite sides, slidably engages a pair of fore-and-aft track members which respectively extend along the contours of the vehicle interior side edges. These tracks terminate proximate the top of the boat's windshield where there is provided a latch mechanism permanently coupled to the windshield which retains the cover in an extended position.

One problem with such an approach, however, is that the tracking mechanism is often mechanically complex. The tracking mechanism comprises a plurality of parts which need be fully integrated into the vehicle's opposing interior sides. Thus, assembly of these mechanisms is quite extensive. Furthermore, these fixtures must be permanently mounted to the vehicle by skilled installers or factory personnel. Additionally, this type of extendable cover makes it difficult to cover headrests or the like which protrude above the fore-and-aft tracking mechanisms.

Another automobile interior cover is disclosed in U.S. Pat. No. 1,878,943 to Lock et al. In this approach, the vehicle interior cover functions as a roof as well as an interior cover. Similar to Halvorsen, the interior cover slidably extends and retracts along integrally mounted fore-and-aft tracks positioned along the opposing surfaces of the vehicle sides. Further, although fully integrated, this cover device requires a plurality of mechanically complex parts which assist deployment of the cover over the interior. Moreover, deployment is manually laborious.

Other vehicle interior covers have been devised which do not necessitate such complex deployment mechanism to retain the cover in an extended position. One such reference is that provided in U.S. Pat. No. 4,828,319 to Benson which discloses an automotive interior cover having a spring-biased furling core which is normally retracted to retain the cover thereon. This cover device is transversely disposed across the rear interior and is positioned relatively low with respect to the rear so that, when retracted, the furling core may not be readily viewed. However, similar to the previously mentioned inventions, the interior cover mechanism in Benson requires fixtures permanently mounted to the vehicle in order to store the apparatus in the vehicle. This complicates mounting (e.g., retro-fitting) and increases costs during installation or manufacture. Moreover, when the interior cover is extended from the rear of the interior to the front dashboard portion, the cover, when deployed, is secured by permanently mounted fixtures affixed to the dashboard.

SUMMARY OF THE INVENTION

Accordingly, it is an object of the present invention to provide a vehicle interior cover apparatus and method which covers a substantial portion of a vehicle interior and facilitates deployment of the cover over the interior compartment.

It is a further object of the present invention to provide a vehicle interior cover apparatus and method which can be retainably secured over the vehicle interior, in a distended position, without requiring any alterations to the exterior or interior of the vehicle.

It is still a further object of the present invention to provide a vehicle interior cover apparatus and method which can be distendably secured to the vehicle by the vehicle owner using only a minimal manual effort.

It is a further object of the present invention to provide a vehicle interior cover apparatus and method which is durable, compact, easy to maintain, has a minimum number of components, is easy to use by unskilled personnel, and is economical to manufacture.

It is another object of the present invention to provide a vehicle interior cover apparatus having an aesthetically acceptable storage envelope for storage of the cover within the interior of the vehicle to thereby obviate the necessity of removing the cover and storing it in the vehicle trunk.

Accordingly, there has been a need for a vehicle interior cover which may be mounted to the interior in a distended position without fixtures permanently mounted to the vehicle. The present invention meets these needs.

In one aspect, the present invention includes a cover for a vehicle interior which includes a rear interior portion and a front dashboard portion. The vehicle interior cover includes sheet-like cover extending from the interior rear portion to the dashboard portion to substantially cover the interior. A rear securing assembly is coupled to the cover and secures the cover to the rear interior portion of the vehicle without the use of fasteners. The cover also includes a front securing assembly coupled to the cover which similarly cooperatively engages structural portions of the vehicle to effect fastener-free securement of the cover. The front securement assembly preferably comprises a resiliently flexible, transversely-extending rod suitably dimensioned for resilient bowing between opposed sides of the interior to releasably secure the cover to the interior proximate the dashboard portion in a longitudinally distended condition.

In another aspect of the present invention, a method for securing a vehicle interior cover between a rear interior portion and a front dashboard portion of a vehicle interior is provided comprising the steps of securing a rear securing mechanism to the rear interior, and securing the front securing mechanism proximate to the front dashboard portion by bowing a flexible rod and inserting it between interior sides of the vehicle such that the cover is releasably secured to the dashboard in a longitudinally distended condition over the vehicle interior.

BRIEF DESCRIPTION OF THE DRAWINGS

The purpose and advantages of the present invention will be apparent to those skilled in the art from the following detailed description in conjunction with the appended drawings in which:

FIG. 1 is a fragmentary, top perspective view of a vehicle interior cover apparatus constructed in accordance with the present invention and mounted over an automobile interior.

FIG. 2 is a fragmentary, side elevation view, partially broken away, of the interior cover apparatus shown in FIG. 1.

FIG. 3 is a fragmentary, top plan view, in partial cross section, of the interior cover apparatus taken substantially along the plane of line 3—3 in FIG. 2.

FIG. 4 is an enlarged fragmentary, a top plan view, in cross section of the windshield frame post of the vehicle taken substantially along the bounded line 4—4 of FIG. 3.

DETAILED DESCRIPTION OF THE PREFERRED EMBODIMENT

The vehicle interior cover of the present invention permits simple deployment by the vehicle owner of the cover over the vehicle interior in a distended condition, without having permanent mounting fasteners installed or mounted in the vehicle.

Reference will now be made in detail to the preferred embodiments of the present invention. While the present invention has been described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIG. 1, where the subject vehicle interior cover, generally designated 30, is shown mounted to a convertible automobile 10. While shown and described herein as mounted to a convertible automobile, it will be understood that the interior cover 30 of the present invention can be adapted to non-convertible automobiles, boats, off-road vehicles, or the like.

Vehicle interior cover apparatus 30 of the present invention comprises, briefly, a sheet-like cover, generally designated 32, a rear securing mechanism, generally designated 34, and a front securing mechanism, generally designated 36. In order that the vehicle owner can use cover 30 without tedious installation of fastening assemblies, it is an important feature of the present invention that both front securing means 36 and rear securing means 34 be formed to cooperatively engage existing structural components of the vehicle to achieve fastener-free mounting of cover 30. In connection with front securing means 36, it is preferred that a resiliently flexible, transversely-extending member be employed that can be inserted in a flexed condition between opposed structural members on opposite sides of the vehicle. Thus, front securing means 36 can be provided by a resilient, transversely extending, flexible rod 48 suitably dimensioned for resilient bowing and insertion between opposed sides of interior 12, for example between opposed windshield posts 13 and 13', to releasably secure sheet-like cover 32 to interior 12 proximate dashboard portion 16.

Rear securing means 34 can be formed in a manner which is similar to front securing means 36, that is, by a bowed rod assembly, but it is preferably to take advantage of other existing structural features of convertibles which are conventionally present. In many convertible automobiles a convertible top storage compartment 20 will be provided and will have a movable, usually pivoted, lid 24 mounted thereto. Thus, the front wall 22 of compartment 20 and movable lid 24 define therebetween a transversely extending slot. Alternatively, the automobile body panel 21 and trunk lid 23 define a similar transversely extending slot 25 (FIG. 3). Either of these slots provide an existing vehicle structure which can be used for mounting of the rear end of cover 30.

In the preferred form, therefore, fastener-free rear securing means 34 of the present invention may be provided advantageously by an enlarged transversely extending member or edge 42 of cover 30. As best seen in FIG. 2, compartment lid 24 can be raised, and enlarged edge 42 placed in the compartment. Lid 42 is then closed on the cover to trap the enlarged edge inside the compartment with the cover extending through the transverse slot between cover 24 and wall 22.

No fasteners or tools are required to "install" either front securing means 36 or rear securing means 34, and the owner can simply take cover 30 out of its packaging and easily mount the cover to the vehicle.

Cover 30 further extends to two opposing sides portions 38 and 38'. Collectively, the cover perimeter, as best shown in FIG. 2, is dimensioned substantially similar to the outer perimeter of the vehicle interior to be covered. Thus, in the preferred embodiment, cover 30 is custom fit to a particular vehicle to assure that a more complete barrier is formed between the environment and vehicle interior 12. However, it will be appreciated that a more generalized shape may also be substantially effective.

Cover means 30 is preferably a sheet-like cover member 32, preferably a flexible fabric material having shielding properties, such as a heavy industrial fabric, canvas, plastic, rubber, leather, neoprene, or the like. Such flexible material allows cover member 32 to lie flush against and conform to the vehicle interior perimeter.

As best shown in FIGS. 1 and 2, cover member 32 extends from the vehicle rear interior 14 to the front dashboard portion 16. Opposing sides 38 and 38' abut upper door edges 26 and 26'. Sheet-like cover member 32 preferably includes headrest-receiving recesses 40 which are positioned centrally and are dimensioned to receive headrests 18. Recesses 40 facilitate deployment of cover means 30 over interior 12 and help maintain cover means 30 in a distended condition by allowing sheet-like cover member 32 to more substantially conform to the contours of vehicle interior 12. Thus, even though headrests 18 protrude upward substantially above vehicle interior 12, sheet-like cover member 32 will still substantially cover interior 12. It will be appreciated that recesses 40 may be dimensioned to either snugly receive or to broadly accommodate headrests 18 without departing from the true scope and spirit of the present invention.

Referring now to FIG. 2, there is shown a convertible top receiving compartment 20 for storing a convertible top (not shown) when the top is retracted. Compartment 20 is typically shaped similar to a box having a front upstanding wall 22, and includes a pivotal lid 24, as best viewed in FIGS. 1-3. As above described, rear securing mechanism 34 is mounted to the rear edge cover member 32 and secures cover member 32 to rear interior portion 14. Rear securing mechanism 34 is dimensioned to be draped over the top edge of compartment front wall 22 and is secured to the rear interior portion 14 when lid 24 is closed with securement member 34 in compartment 20. In the preferred form, rear securing mechanism 34 is provided by a transversely extending sleeve in an edge 42 of cover member 32 in which a rod or dowel 44 is mounted. Thus, when sleeve portion 42 with dowel 44 therein is positioned in compartment 20 and lid 24 is closed, as shown in FIG. 3, sheet-like cover 32 is trapped against the upper edge of front wall 22 and lid 24 so that cover 32 may not be removed from compartment 20 without lifting lid 24. Accordingly, rear securing mechanism 34 effects very positive securement of a rear edge of cover member 32 without special mounting fasteners, fixtures, or alterations to vehicle 10.

In the preferred embodiment, dowel 44 is a ⅜ D wooden dowel. Dowel 44, of course, may be any diameter sufficiently larger than the slot between wall 22 and lid 24 to effect trapping of edge 42. Dowel 44 can be composed of any rigid or semi-rigid material.

Attention is now directed to FIGS. 3 and 4 which illustrate the front securing mechanism 36 mounted proximate a vehicle dashboard portion 16. Front securing mechanism 36 includes a bow-shaped sleeve portion 46 provided proximate a front edge of cover 32. Sleeve 46 advantageously is shaped substantially similar to the bow-shaped intersection 28 between the windshield 11 and dashboard 16. Mounted in sleeve 46 is a resiliently flexible transversely-extending rod 48 dimensioned for bowing between opposed sides of interior 12 to releasably secure sheet-like cover member 32 to interior 12 proximate dashboard 16. Securement 48 is a resiliently flexible member which, when non-tensioned, is substantially linear. When rod 48 is inserted into sleeve 46, via first opening 50, rod 48 assumes the general bow shape of sleeve 46, and is thus flexed. As will be discussed in greater detail below, this bow-shaped flexing of rod 48 facilitates releasable securement of front securing mechanism proximate dashboard portion 16 while further maintaining sheet-like cover 32 in a distended condition over vehicle dashboard 16.

Although rod 48 preferably is inserted into bow-shaped sleeve 46, it will be appreciated that rod 48 need not be inserted into a sleeve in order for the present invention to function properly. For example, rod 48 may be mounted transversely to the exterior of a bow-shaped front edge of the cover by clips or other fasteners without departing from the true spirit and nature of the present invention.

As best illustrated in FIG. 3, rod 48 is dimensioned such that the opposing distal ends 52 and 52' of rod 48 protrude outward from the sleeve end openings. Protruding opposing distal ends 52 and 52' of rod 48 preferably have cushioning members 53 mounted thereto, such as sheepskin patches. Sheepskin cushions 53 prevent scratching or marring of posts 13, 13' and dashboard 16. Thus, as best viewed in FIG. 4, when front securing mechanism 36 is to be secured proximate dashboard 16, resilient rod 48 is resiliently bowed so that rod ends 52 and 52' and cushions 53 may engage opposed windshield posts 13 and 13'.

As previously mentioned, such resilient bowing, and subsequent engagement of opposed posts, performs two functions. The first function is that the resilient bowing of rod 48 facilitates securement of front securing mechanism 36 proximate windshield-dashboard intersection 28. Secondly, the resilient bowing of rod 48 longitudinally tensions sheet-like cover 32 so that it is maintained in a distended condition over vehicle interior 12. Because rear securing mechanism 34 anchors sheet-like cover 32 firmly to rear interior 14, the opposed tensioning created by bowed rod 48, when engaged proximate front dashboard portion 16, resiliently retains cover apparatus 30 in a relatively taut and non-sagging condition.

Finally, without the flexing of rod 48, dashboard sleeve 46 would not maintain its bow-shaped form which substantially covers dashboard portion 16. Therefore, and in accordance with the present invention, front securing mechanism 36 and rear securing mechanism 34 collectively maintain cover apparatus 30 in a distended condition over interior 12 without requiring any permanent fasteners, attachments or alterations to the vehicle 10. Thus, upon removal of cover apparatus 30, no visible nor permanent fasteners remain attached to the vehicle.

Preferably, rod 48 comprises a solid fiberglass member having resilient properties. However, rod 48 just as easily could be a hollow tube or semi-solid rod member. Moreover, rod 48 could be composed of a resilient metallic, plastic, or rubber member without departing from the true spirit and nature of the present invention.

Accordingly, to effect installation of cover apparatus 30 over interior 12, compartment sleeve 42 and dowel 44 of rear securing means 34 will be positioned transversely across interior 12 in compartment 20. After the compartment lid 24 is closed, thereby securely retaining rear securing mechanism 34 to the rear interior 14, sheet-like cover mechanism 32 may be pulled forwardly over interior 12. Front securing mechanism 36, including resilient rod 48, will be resiliently bowed between windshield post members 13 and 13'.

As an optional feature of the cover of the present invention, transverse cover distending means in the form of adjustable handle straps 54 and 54' may be coupled to the opposing sides 38 and 38' of cover 32 proximate vehicle door handles 15 and 15'. As illustrated in FIGS. 1 and 3, handle straps 54 and 54' may be formed as elongated strips of fabric having ends 56 and 56' permanently coupled to cover sides 38 and 38'. The other ends 58 and 58' of handle straps 54 and 54' may be then inserted through the respective door handles 15 and 15' and adjustably secured to the top surface of sheet-like cover 32 by hook and loop fastener means, such as VELCRO brand fasteners. As handle straps 54 and 54' are pulled through door handles 15 and 15' such that a slight tension is created, the sheet-like cover opposing sides 38 and 38' are distended and urged flush against vehicle 10. Typically, door handles 15 and 15' are situated proximate the rear interior 14 of a convertible automobile 10. Thus, as shown in FIG. 3, handle straps 54 and 54' are situated closer to the rear securing mechanism 34. Accordingly, handle straps 54 and 54' provide additional support for maintaining cover means 30 in a transversely taut, distended condition over vehicle interior 12.

In another optional transverse cover distending means which may be incorporated in cover 30 of the present invention to secure and distend the cover without the use of fasteners are mirror securing assemblies 60 and 60'. In the preferred form, best seen in FIG. 4, mirror securing assembly 60 includes a resiliently extensible cord 61, such as a bungee or shock cord, which is secured at end 62 to an edge 38 of cover member 32. An opposite end of cord 61 has an enlarged member 63 mounted thereto. In order to tension and distend cover member 32 laterally, cord 61 is wrapped under and around mounting arm 64 for vehicle mirror 65. The cord is stretched until enlarged head or member 63 can be trapped between windshield post 13 and mirror 65 so that the cord cannot be pulled back through the slot or gap between post 13 and mirror 65. Mirror securing assembly 60 applies both a longitudinal as well as transverse tension force to cover means 30 and can be used as front securing means 36, but with the disadvantage of not securing the cover in place over dashboard 16 as positively as does rod assembly 48.

It is also preferable that vehicle interior cover 30 may be mounted in a storage envelope 70 for storage of cover apparatus 30 during periods of non-use, as shown in FIGS. 2 and 3. Envelope 70 is preferably coupled to the underside of sheet-like cover 32 proximate, but in front of, rear securing mechanism 34. Furthermore, storage envelope 70 is suitably dimensioned to receive all of apparatus 30, including resilient rod 48, which may be bowed to fit therein. A flap 72 may be provided to facilitate storage of the rod in a bowed condition, which is maintained by arcuate sleeve 46. Preferably, envelope 70 depends downward and is positioned such that it is not too visible when in use.

It will be appreciated that rear securing mechanism 34 may still be secured into compartment 20 when the remaining structure of cover apparatus 30 is stored in envelope 70. Accordingly, when removal of cover apparatus 30 from over interior 12 is desirous, substantially all of cover apparatus 30 can be folded and stored in envelope 70 just behind the interior seats while rear securing mechanism 34 still remains secured to the rear interior 14. Similarly, cover apparatus 30 may be removed from envelope 70 and reinstalled over interior 12 in a distended position, using only minimal effort.

A method for securing vehicle interior cover 30 in a distended position between rear interior portion 14 and front dashboard portion 16 of vehicle interior 12 may be accomplished by securing rear securing mechanism 34 to the rear interior, and securing front securing mechanism 36 proximate front dashboard portion 16. This step may be accomplished by bowing rod 48 such that sheet-like cover 32 is releasably secured to dashboard portion 16 whereby cover apparatus 30 will be distended over vehicle interior 12.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims.

Therefore, persons of ordinary skill in this field are to understand that all such equivalent structures are to be included within the scope of the following claims.

What is claimed is:

1. An interior cover for a vehicle interior of a vehicle including a rear interior portion and a front dashboard portion having vertically extending windshield posts on opposed sides of the vehicle, said vehicle further including a slot extending transversely across the vehicle form proximate one side of the vehicle to proximate the other side of the vehicle, said slot being defined by one of a body panel defining a trunk opening and a movable trunk lid, and a convertible top storage compartment wall and a movable compartment top, said interior cover comprising:
    flexible sheet-like cover means extending from a rear end positioned proximate said rear interior portion to a front end positioned proximate said dashboard portion to substantially cover said interior;
    rear securing means coupled to said cover means proximate said rear end and formed for fastener-free securement of said rear end in said slot to releasably secure said cover means to said rear interior portion; and
    front securing means coupled to said cover means proximate said front end and formed for fastener-free securement of the front end between the windshield posts to releasably secure said cover means over said interior proximate said dashboard portion.

2. The interior cover for a vehicle interior as defined in claim 1 wherein
    said front securing means includes resiliently flexible means dimensioned to be inserted between said windshield posts in a flexed condition to longitudinally distend said cover means.

3. The interior cover for a vehicle interior as defined in claim 1 wherein
    said rear securing means includes a transversely extending enlarged member positioned on a far side of said slot and said cover means is formed to extend from said transversely extending enlarged member through said slot.

4. The interior cover for a vehicle interior as defined in claim 1, further comprising:
    transverse cover distending means formed for fastener-free cooperative engagement with structural elements on the opposed sides of said vehicle to distend said cover means therebetween.

5. The interior cover for a vehicle interior as defined in claim 4, wherein:
said vehicle further includes door handles on the opposed sides of said vehicle; and
said transverse cover distending means includes transversely adjustable handle-engaging strap assemblies.

6. The interior cover for a vehicle interior as defined in claim 4 wherein:
said vehicle further includes mirror assemblies on the opposed sides of said vehicle; and
said transverse cover distending means includes resiliently extensible cord means having enlarged ends suitable for wrapping around and trapping in said mirror assemblies.

7. An interior cover for a vehicle interior of a vehicle, the interior including a rear interior portion and a front dashboard portion, said cover comprising:
sheet-like cover means extending from the rear interior portion to the dashboard portion to substantially cover the interior;
rear securing means coupled to said cover means and securing said cover means to said rear interior portion; and
front securing means coupled to said cover means and including a resiliently flexible transversely extending rod means dimensioned for resilient bowing between opposed sides of the dashboard portion to releasably secure said cover means to the interior proximate the dashboard portion.

8. The interior cover as defined in claim 7 wherein said front securing means further includes a sleeve which is dimensioned to receive said rod means.

9. The interior cover as defined in claim 8 wherein said resiliently flexible rod means comprises a fiberglass elongated rod with cushion means secured to opposed ends thereof.

10. The interior cover as defined in claim 7 wherein said front securing means further includes an arcuate sleeve which is dimensioned to receive said rod means.

11. The interior cover as defined in claim 10 wherein:
the interior proximate the dashboard portion is defined in part by a windshield supported on a pair of opposed frame members; and
said arcuate sleeve substantially matches a curvature of the windshield to substantially cover the dashboard portion.

12. The interior cover as defined in claim 7 wherein:
the vehicle comprises a convertible automobile;
said cover means comprises a flexible fabric; and
a storage envelope means is dimensioned to receive said cover means therein and is secured to said cover means proximate said rear securing means.

13. The interior cover as defined in claim 7 further including:
strap means coupled to an intermediate portion of said cover means for releasably strapping said cover means to a door handle of the vehicle.

14. The interior cover as defined in claim 7 wherein said rod means is bowed to tension said cover means between the rear interior portion and the dashboard portion to secure said cover means in a longitudinally distended condition.

15. The interior cover as defined in claim 7 further including:
at least one releasable mirror-mounting means coupled to a side portion of said cover means.

16. The interior cover as defined in claim 15 wherein said mirror-mounting means is provided by a resiliently extensible cord having an end structure sufficiently larger than said cord to enable trapping of said core between mirror-mounting members defining a slot receiving said cord.

17. The interior cover as defined in claim 7 wherein:
the rear interior portion includes a convertible top storage compartment; and
said rear securing means is dimensioned to be securably retained in the storage compartment.

18. The interior cover as defined in claim 17 wherein said rear securing means includes a substantially rigid elongated member transversely disposed in the storage compartment.

19. The interior cover as defined in claim 7, further comprising
storage envelope means dimensioned to receive said cover means for storing said cover means and secured to said cover means proximate said rear securing means.

20. An interior cover for a vehicle interior, the interior including a rear interior portion and a front dashboard portion, said cover comprising:
a flexible sheet-like fabric cover formed to extend from a rear end thereof for mounting to the rear interior portion to a front end thereof for mounting to the dashboard portion to substantially cover the interior;
rear securing means coupled to said fabric cover proximate said rear end for securing said fabric cover to said rear interior portion; and
front securing means coupled to said fabric cover and including a resiliently flexible transversely extending rod dimensioned for resilient bowing between opposed sides of the dashboard portion to releasably distend said fabric cover over the interior.

21. A method for securing a vehicle interior cover in a distended condition between a rear interior portion and a front dashboard portion of a vehicle interior, comprising the steps of:
deploying a sheet-like cover means to extend from the rear interior portion to the dashboard portion to substantially cover the interior;
securing rear securing means to the rear interior portion; and
securing front securing means proximate the front dashboard portion by bowing a resiliently flexible transversely extending rod means coupled to said cover means, and inserting said rod means between opposed interior side structures proximate the dashboard portion to releasably secure said cover means to the dashboard portion in a distended condition over the interior.

* * * * *